Aug. 16, 1960 M. FRIEDEL 2,949,077
PRINTING FRAME
Filed April 17, 1958

INVENTOR.
MURRAY FRIEDEL
BY *S.B. Schlessel*
ATTORNEY

2,949,077

PRINTING FRAME

Murray Friedel, Miami Beach, Fla., assignor to Statmaster Corporation, New York, N.Y.

Filed Apr. 17, 1958, Ser. No. 729,146

2 Claims. (Cl. 95—77)

This invention relates to the field of photography and photoprinting apparatuses, and has for its objective the provision of a printing frame on which the sensitized paper to be exposed can be secured and held firmly in place within a selected perimeter.

This application is a continuation-in-part of my co-pending application for Letters Patent on a Photocopying and Photoprinting Apparatus, S.N. 532,242, filed in the United States Patent Office on September 2, 1955, now Patent No. 2,846,920, on which division was required.

In the present state of the art of photoprinting and photocopying sensitized paper is usually made up into rolls which are inserted into a photocopying machine, supported on rollers therein. When a print is desired, a large expanse of sensitized paper is exposed to the lighted print through a lense or prism for the exposure period, the roll turned and cut, and the exposed sheet of sensitized, exposed paper removed and developed. The copy is then cut from the exposed sheet of paper, and the remainder thrown away as waste. In attempts to eliminate this waste of sensitized paper, some apparatuses have been used where the sheets of sensitized paper are of the same size as the original print, and are kept in exposure position by means of a holding or printing frame comprising fundamentally two glass plates between which the sensitized paper is held. In setting the sensitized paper between these plates the paper generally slips from position before the plates can be firmly secured together. Attempts have been made to avoid this problem by the provision of a plurality of nested frames in a graduated series of sizes for insertion in the holding frame proper, but this has resulted in expensive, complicated and cumbersome structures of doubtful practicality.

The principal object of my invention, therefore, lies in the provision of a printing frame adapted to receive and securely retain pre-selected sizes of sensitized paper in desired position.

Another important object of my invention lies in the provision of a printing frame in which the sensitized paper can be moved and locked into place while a portion thereof is still being handled by the operator, because of its unique construction.

A third important object of my invention lies in the provision of size markers on the printing frame itself for graduated sizes of paper.

Still another important object lies in the provision of a printing frame which is inexpensive to manufacture and simple to operate.

Other salient objects, advantages and functional features of my invention, together with the novel features of construction and arrangement of parts, will be more readily apparent from an examination of the following description, taken with the accompanying drawings, wherein Fig. 1 is a rear view of a preferred embodiment of the printing frame, showing inner arrangement of parts located within the unit, in closed position;

Similar reference characters designate similar parts throughout the different views.

Figure 1:
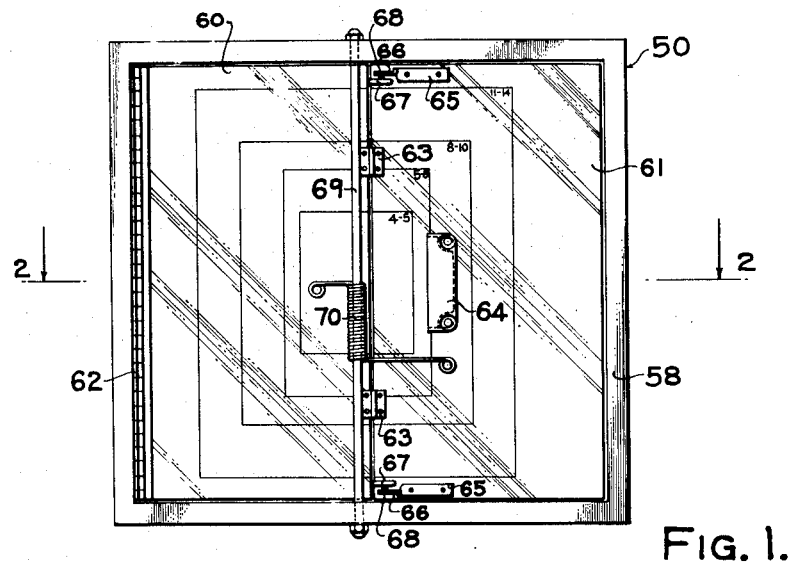
Figure 2:
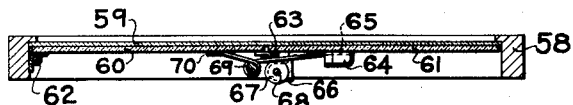
Fig. 2 is a cross-sectional view, taken on lines 2—2 of Fig. 1.
Figure 3:
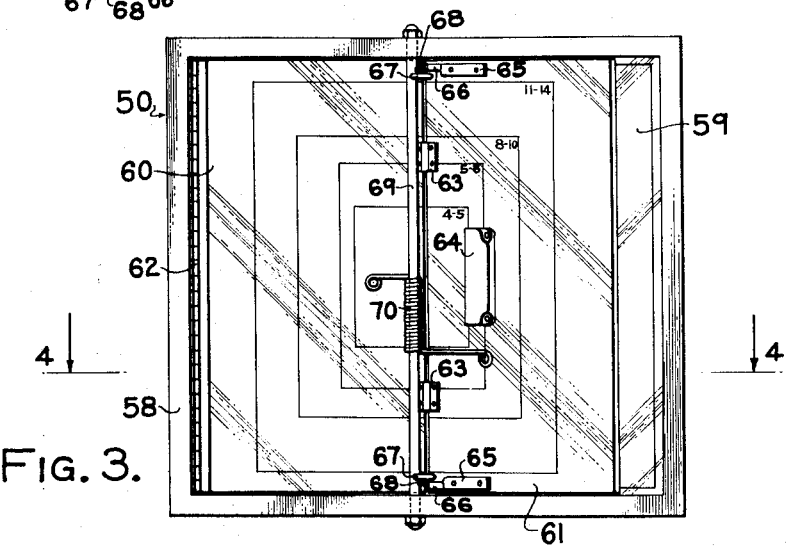
Fig. 3 is a view similar to Fig. 1, but showing the holding panels of the printing frame open to receive a sheet of sensitized paper.
Figure 4:
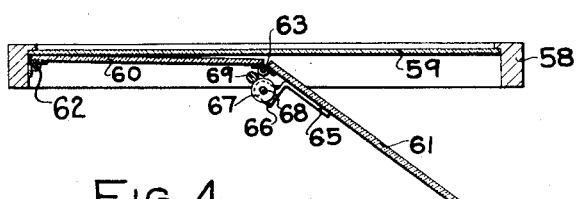
Fig. 4 is a cross-sectional vitw, taken on lines 4—4 of Fig. 3.

Illustrative of the embodiment shown by the drawings, and referring thereto, the printing frame 50 comprises a square framework 58, in the front surface of which is secured a transparent panel 59, of glass, plastic or the like. A pair of translucent panels 60 and 61, made of plastic or like material, sand-blasted on the front surfaces to make the reflected image from a prism (not shown) visible thereon, are provided in back of the front panel 59, adapted to be pressed firmly together with the front panel 59, to engage between them a section of photo-sensitized paper, the rear panel 60 being pivotally secured to the side of the framework 58 by a hinge 62 extending the full length of the side thereof, and the rear panel 60 being further secured to the rear panel 61, at its opposite side, by a pair of hinges 63, as shown. The rear panel 61 is further provided with a finger piece 64, located centrally thereon, and a pair of L plates 85 secured thereto, one adjacent the top and the other adjacent the bottom of the rear panel 61, the vertical sections of the L plates 65 having each an extension 66, to which a roller bearing 67 is secured by means of a pin 68, the roller bearing 67 being raised and adjacent the edge of the rear panel 60, as shown. A rod 69 is bolted vertically into the framework 58 of the printing frame 50, directly behind rear panel 60, adjacent to the edge thereof hinged to the rear panel 61, and is provided with a spiral spring 70 mounted thereon, one end of which is tensioned against the rear panel 60, and the other end against the rear panel 61, holding rear panels 60 and 61 firmly against the front panel 59, to hold securely between them a section of sensitized paper for photoprinting. The panels 60 and 61 are provided with centralized border markings to designate the particular sizes of sensitized paper to be inserted, all of which are centered with respect to the printing frame 50 and the lens or prism (not shown) through which the image to be photographed is projected, such as 4″ x 5″, 5″ x 8″, etc. The holder plate for the original print to be photographed (not shown) is similarly marked to coincide therewith.

In the operation of the printing frame 50, the rear panel 61 is lifted against the tension spring 70 by means of lifting the finger piece 64 away from the front panel 59 until the bearings 67 are pressed against the rod 69, whereupon the rod 69 acts as a fulcrum to raise the rear panel 60 from contact with the front panel 59. The sensitized paper is then inserted between the front panel 59 and the rear panel 60 until its side, top and bottom edges register with the markings for that particular size of paper. While the paper is still being held in that position, in the portion thereof which is not under rear panel 60, the rear panel 61 is slowly released until the roller bearings 67 leave the rod 69, at which time the rear panel 60 is firmly pressed against the front panel 59, holding the sensitized paper firmly in the position selected. The rear panel 61 is then completely released, and it tensions the other one-half of the sensitized paper against the front panel 59. Removal of the sensitized paper after exposure is accomplished by again raising rear panels 60 and 61 by means of the finger piece 64.

The embodiment above described, and shown by the drawings, is by way of illustration only, and various changes may be made in the construction, composition and arrangement of parts without limitation upon or departure from the spirit and scope of the invention, or sacrificing any of the advantages thereof inherent therein, all of which are claimed.

Having described my invention, I claim;

1. A printing frame comprising a framework provided with a fixed transparent front panel and a pair of pivotal translucent rear panels, the rear panels being sand-blasted upon their surfaces adjacent the front panel, one rear panel longitudinally hinged to the framework along one edge and hinged to the second rear panel along its opposite edge, a rod bolted longitudinally to the framework behind the first rear panel adjacent the second rear panel, a spring mounted on the rod and disposed to tension the rear panels against the front panel, the second rear panel provided with a finger piece and a pair of plates secured thereto adjacent its top and bottom edges, the plates provided with arms disposed perpendicular to the panel, and roller bearings secured to the arms, the roller bearings adapted to come in registry with and contact the rod upon pivotal movement of the second rear panel, whereby pressure of the roller bearings against the rod raises the first rear panel from contact engagement with the front panel against the spring tension to allow insertion of sensitized paper between the front panel and the rear panels.

2. A printing frame in accordance with claim 1, the rear panels being further provided with centralized perimetrical markings for a graduated series of paper sizes.

References Cited in the file of this patent

UNITED STATES PATENTS

| | | |
|---|---|---|
| 924,327 | Dow | June 8, 1909 |
| 1,048,160 | Higgins | Dec. 24, 1912 |
| 1,799,818 | Hopkins | Apr. 7, 1931 |